United States Patent [19] [11] 3,971,739
McCrae et al. [45] July 27, 1976

[54] TRI OR TETRADENTATE METAL AZO PIGMENT COMPLEXES

[75] Inventors: James McGeachie McCrae, Stewarton; Christopher Midcalf, Kilbarchan, both of Scotland

[73] Assignee: Ciba-Geigy Corporation, Ardsley, N.Y.

[22] Filed: Sept. 20, 1974

[21] Appl. No.: 507,643

[30] Foreign Application Priority Data
Sept. 22, 1973 United Kingdom............ 44556/73

[52] U.S. Cl.............................. 260/151; 260/149; 260/150
[51] Int. Cl.² ................. C09B 45/18; C09B 45/22
[58] Field of Search ......................... 260/149–151

[56] References Cited
UNITED STATES PATENTS
2,839,520  6/1958  Neier............................. 260/151 X
3,169,123  2/1965  Neier............................. 260/151 X
3,391,132  7/1968  Beffa et al. .................... 260/151 X FOREIGN PATENTS OR APPLICATIONS
683,307  3/1964  Canada............................. 260/149

Primary Examiner—Allen B. Curtis
Attorney, Agent, or Firm—Vincent J. Cavalieri

[57] ABSTRACT

A tri- or tetradentate metal complex having the formula

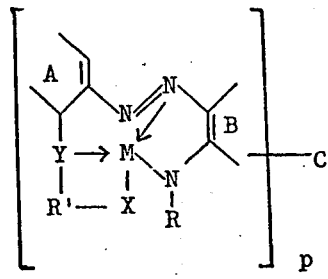

wherein A is an aryl or heterocyclic residue, B is an aliphatic, aryl or heterocyclic residue, R is an alkyl, cycloalkyl, aryl, aralkyl, or heterocyclic residue or R is the atoms required to complete, together with residue B, a heterocyclic residue, R' is a carbon chain, which may form part of a carbocyclic ring, having from 1 to 3 carbon atoms between the X and Y substituents, X and Y are the same or different and each is O, S, N, $CO_2$ or N-R wherein R has its previous significance, M is a Cu, Zn or Ni metal atom, p is 1 or 2 and when p is 1, C is a hydrogen atom attached to one of the residues A, B, R and R' and when p is 2, C is either a direct bond linking two residues A, B, R or R', or C is an alkylene, arylene or alkarylene group linking two residues A, B, R or R', which is useful for pigmenting organic material, preferably lacquer, paint or printing ink.

6 Claims, No Drawings

TRI OR TETRADENTATE METAL AZO PIGMENT COMPLEXES

The present invention relates to new complex pigments, and, in particular, to new metal azo pigments and to processes for producing these pigments.

According to the present invention, there is provided tri- or tetradentate metal complex having the formula:

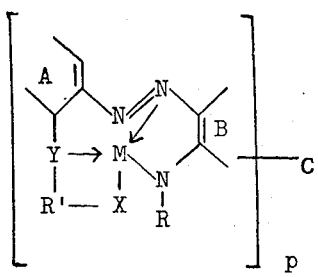   I wherein A is an aryl or heterocyclic residue, B is an aliphatic, aryl or heterocyclic residue, R is an alkyl, cycloalkyl, aryl, aralkyl or heterocyclic residue or R is the atoms required to complete, together with residue B, a heterocyclic residue, R' is a carbon chain, which may form part of a carbocyclic ring, and contains from 1 to 3 carbon atoms between the X and Y substituents, Y and X are the same or different and each is O, S, N, $CO_2$ or N-R wherein R has its previous significance, M is a Cu, Zn or Ni metal atom, p is 1 or 2 and when p is 1, C is a hydrogen atom attached to one of the residues, A, B, R and R' and when p is 2, C is either a direct bond linking two residues A, B, R and R', or C is an alkylene, arylene or aralkylene group linking two residues A, B, R and R'.

A preferred group of metal complexes according to the invention are those having the formula:

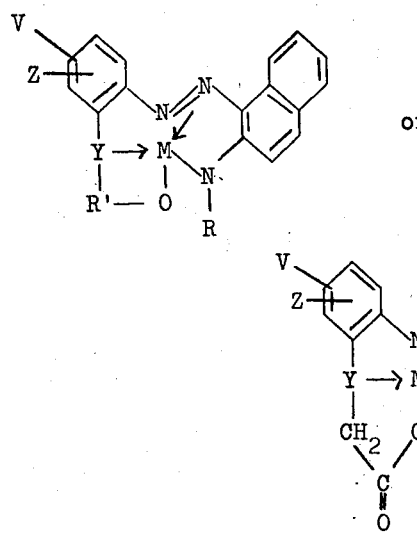

wherein Y is O or S, R' is 1,2-phenylene, R is phenyl or ethyl and V and Z are the same or different and each is hydrogen, nitro or alkyl or alkoxy having from 1 to 4 carbon atoms.

When A and/or B is an aryl residue the latter preferably contains from 6 to 14 carbon atoms and may consist of a single aromatic ring or two or more fused aromatic rings. The aryl residue may be unsubstituted or substituted with one or more groups which do not impart water solubility to the complex compound of formula I, for instance alkyl, alkoxy, carboxyalkyl or alkyl carbamoyl groups, each having from 1 to 4 carbon atoms in the alkyl moiety, arylcarboxyarylamide, arylcarbamoyl groups, nitro groups or halogen atoms. Preferred examples of aryl residues A and/or B are phenyl and naphthyl residues.

When A and/or B is a heterocyclic residue, it may be either unsubstituted or substituted with one or more of the non- water- solubilising groups disclosed hereinbefore. Preferred heterocyclic residues A and/or B are pyrazol - 5 - one residues.

When B is an aliphatic residue it may be the residue of any aliphatic coupling component which is capable of coupling with a diazonium salt.

The preferred aliphatic residue is 1-methyl-1(anilinocarbonyl)-ethylene residue or a derivative thereof.

R is a monovalent group and may be an alkyl residue having from 1 to 20 carbon atoms, preferably from 1 to 12 carbon atoms such as a methyl, ethyl, propyl, butyl, hexyl, octyl, decyl or dodecyl residue; a cycloalkyl residue having 5 or 6 carbon atoms; an aryl residue having from 6 to 14 carbon atoms such as a phenyl or naphthyl residue; an aralkyl residue having from 7 to 12 carbon atoms, especially a benzyl residue or a heterocyclic residue such as a pyrazol-5-one residue.

R' is a divalent group and may be saturated or unsaturated. For instance R' may be a methylene, 1,2-ethylene, 1,2- or 1,3-propylene, allyl, methallyl, 1,2-, 1,3-, or 1,4-phenylene or a 4,4'-biphenylene residue.

Preferably, p is 1 and C is a hydrogen atom attached to one of the residues A, B, R and R'. Alternatively however when p is 2, C may be either a direct bond linking two residues A, B, R or R' which may be, for example, 1,4-phenylene or 4,4'-biphenylene residues, or C may be an alkylene, arylene or aralkylene residue linking two residues A, B, R and R'.

Specific classes of compounds of formula I of particular interest are those having the formula:

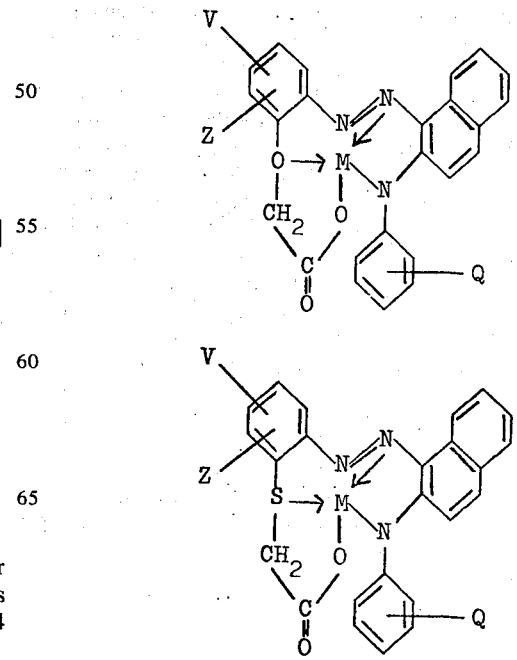

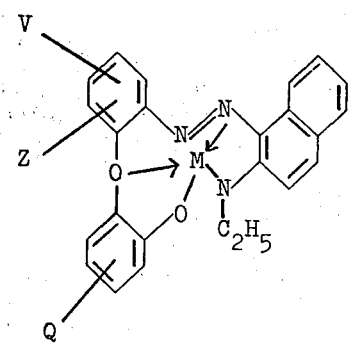

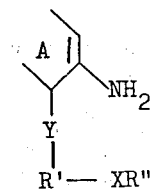

III with a compound of formula:

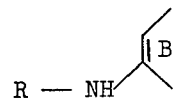

IV wherein A, Y, R', X, B and Y have their previous significance, and R'' is hydrogen or a methyl residue.

The starting-materials of formulae III and IV are well-known per se.

Suitable coupling components of formula III for use in the present invention include:
N-phenyl-β-naphthylamine
N-methyl-β-napthylamine
N-ethyl-β-naphthylamine
N-(n-propyl)-β-naphthylamine
N-(n-butyl)-β-naphthylamine
N-(4-chlorophenyl)-β-naphthylamine As examples of amines of formula IV suitable for use in the process of the present invention, there may be mentioned the following: 5-chloro-2-(carboxymethoxy)aniline (or lactam thereof) 2-(carboxymethoxy) aniline (or lactam thereof) 2-(carboxymethylthio) aniline (or lactam thereof) 2-(1-hydroxyphenyloxy) aniline Because of their insolubility in the reaction medium, the compounds of formula I can easily be isolated from the reaction mixture by filtration The compounds of formula I may be employed as pigments directly after production; that is after they have been filtered off from their crude reaction liquors and dried. Alternatively, they may be first processed using known wet or dry conditioning techniques such as grinding, either alone or in the presence of a water-soluble salt or other medium which can be subsequently removed, for instance by washing.

Accordingly, the present invention further provides a method of colouring organic material comprising incorporating into the organic material a minor proportion of a compound of formula I. The present invention also includes organic material so coloured.

The proportion of the compound of formula I employed to colour organic material according to the invention may be varied within a wide range, but is normally within the range of from 0.1% to 10%, preferably from 0.5% to 5% by weight based on the total weight of organic material to be coloured.

Organic materials which may be coloured according to the invention include high molecular organic material, for example, cellulose ethers and cellulose esters such as ethyl cellulose acetylcellulose and nitrocellulose, polyamides, polyurethanes and polyesters, natural and synthetic resins such as aminoplasts, especially urea-formaldehyde and melamineformaldehyde resins, alkyl resins, phenoplasts, polycarbonates, polyolefines such as polystyrene, polyvinyl chloride, polyethylene, polypropylene, polyacrylonitrile, polyacrylic acid esters, rubber, casein, silicone and silicone resins, individually or in admixture. It does not matter whether these high molecular compounds are in the form of The present invention also provides a process of producing a compound of formula I comprising metallising a compound having the formula:

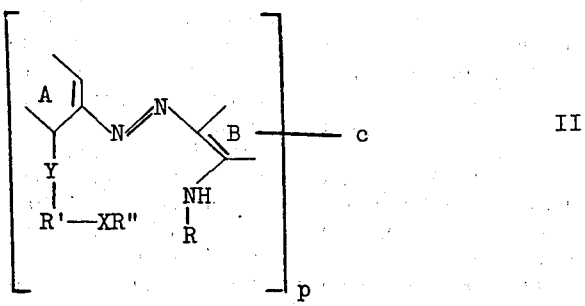

wherein A, B, R, R', X, C, P and Y have their previous significance and R'' is hydrogen or a methyl residue.

The metallisation of the compound of formula II may be carried out directly in the reaction medium used to produce the compound of formula II itself. Alternatively, the compound of formula II may be separated from its crude reaction mixture, washed free from impurities and resuspended, prior to metallisation, in a solvent which may be the same as, or different from any solvent used in the production of the compound of formula II.

The metallisation may be effected using a solution or suspension of any suitable salt or complex of the metal M. For instance, when the metallisation is a coppering process, a suspension of a copper salt in an organic solvent or an aqueous solution of a copper salt such as copper acetate, cuprammonium sulphate or sodium cuprotartrate may be used. In the case of metallisation with zinc, an aqueous or an organic solution of a zinc salt such as zinc sulphate may be used. When the metallisation is effected using nickel, it is convenient to use a solution of nickel acetate tetrahydrate in methyl cellosolve.

Many of the compounds of formula II are new compounds per se and these compounds may be produced by methods known per se.

The compounds of formula II may be produced, for instance, by coupling a diazo compound of an amine of formula:

plastic masses or melts or in the form of spinning solutions. The compounds of formula I are of particular interest, however, for the colouration of lacquers, paints and printing inks.

Depending upon the end use, it may be advantageous to employ the compounds of formula I as a toner or in the form of a pigment preparation.

As a rule, the compound of formula I are characterised by excellent light and solvent fastness properties and high colour strength.

Some Examples will now be given, in which parts and percentages are by weight.

PREPARATION OF LIGANDS

EXAMPLE 1

44.7 parts of 2-amino phenyl glycollic acid lactam were refluxed in 300 parts of 20% sodium hydroxide solution for one hour then cooled to 0°–5°C. 20.7 parts of sodium nitrite in 40 parts of water were added to this solution. The resultant solution was added to 210 parts of concentrated hydrochloric acid over fifteen minutes which was being stirred at 0°C.

65.7 parts N-phenyl-β-naphthylamine were dissolved in 800 parts of hot ethanol then allowed to cool to room temperature. The diazo solution was then added to the ethanolic solution over twenty minutes and left to stir for a further one hour. The resultant suspension was filtered, washed with 500 parts of 50% aqueous ethanol followed by 500 parts of cold water then the press cake oven dried at 55°C. In this way, there were obtained 111.6 parts (93.7%) 157°–158°C. and having the structure.

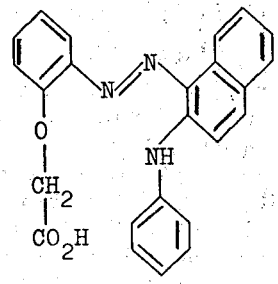

18.4 parts of the product of Example 1 as paste before drying were mixed with high speed stirring into 400 parts of cold water containing 0.15 parts of Solumin FlOS (the sodium salt of sulphonated alkyl phenoxy polyethoxy ethanol). 20.4 parts of sodium acetate trihydrate were added followed by 13.74 parts of copper sulphate pentahydrate dissolved in 50 parts of water. The temperature of the suspension was raised to 95°C by steam injection and held at 95°C with stirring for 3 hours. The resultant suspension was filtered hot, washed with hot water untill free of sulphate and dried at 79°C. Thus were obtained 20.2 parts of maroon solid of melting point not less than 300°C.

EXAMPLES 2 to 4

Using the procedure described in Example 1 the amines and the coupling components shown in the following Table I were reacted to produce the corresponding compound of formula II.

Table I

| Ex. | Amine | Coupling Compound | M. pt [°C] | Yield [%] |
|---|---|---|---|---|
| 2 | (Cl-substituted benzothiazinone) | (N-phenyl-naphthylamine) | 149 – 50 | 80 |
| 3 | (benzoxazinone) | (N-phenyl-naphthylamine) | 182 – 83 | 90 |
| 4 | (Cl-substituted benzoxazinone) | (N-(chlorophenyl)-naphthylamine) | 144 – 45 | 86 |

PREPARATION OF METAL COMPLEXES

EXAMPLE 5

79.4 parts of the product of Example 1 were dissolved in 800 parts of methyl cellosolve and to this solution was added 40.0 parts of copper acetate mononyorate in 400 parts of dimethyl formamide and the mixture refluxed for 6 hours. The resultant precipitate was filtered, washed ethanol than oven dried at 55°C. In this way, there were obtained 72.44 parts (79% yield) of a maroon solid of melting point not less than 300°C. and having the formula:

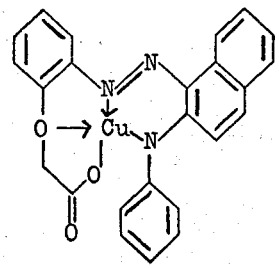

EXAMPLES 6 to 12

Using the procedure described in Example 5, the compounds of formula I shown in the following Table II were prepared from the corresponding coupling components and amines also shown in Table II.

Table II

| Ex. | Ligand | Product | Colour in Lacquer |
|-----|--------|---------|-------------------|
| 6 | | | plum |
| 7 | | | blue-red |
| 8 | | | bright red |

Table II

| Ex. | Ligand | Product | Colour in Lacquer |
|---|---|---|---|
| 9 | | | maroon |
| 10 | | | light maroon |
| 11 | | | red |
| 12 | | | light violet |

We claim:
1. A tri- or tetradentate metal complex having the formula

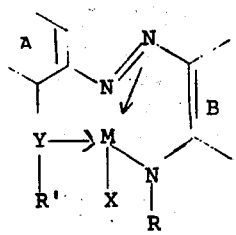

wherein A is an phenyl or naphthyl residue, B is an phenyl or naphthyl residue, R is an alkyl having 1 to 20 carbon atoms or phenyl or biphenyl residue, R' is a carbon chain, which may form part of a carbocyclic ring, having from 1 to 3 carbon atoms between the X and Y substituents, X and Y are the same or different and each is O or S, and M is a Cu, Zn or Ni metal atom.

2. A metal complex as claimed in claim 1 of the formula

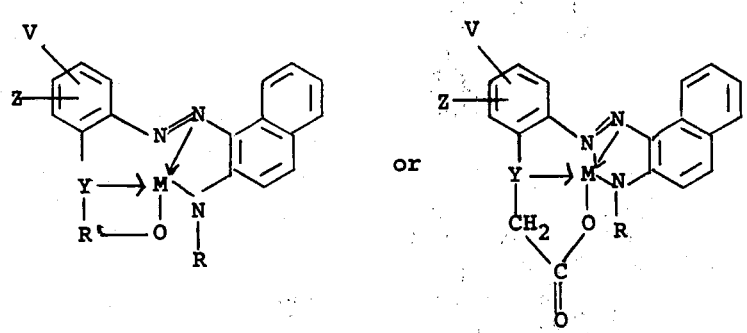

wherein Y is O or S, R' is 1,2-phenylene, R is

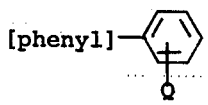

or ethyl and V, Q and Z are the same or different and each is hydrogen or halogen.

3. A metal complex as claimed in claim 2 of the formula

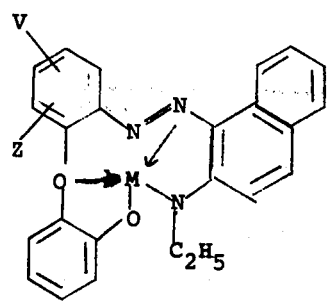

wherein M is as defined in claim 1 and V and Z are as defined in claim 2.

4. A metal complex as claimed in claim 2 of the formula

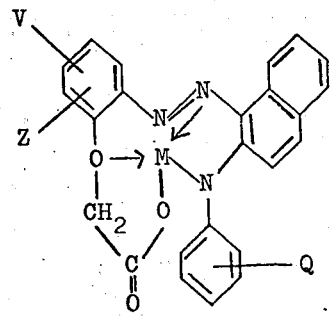

wherein M is as defined in claim 1 and V, Z and Q are as defined in claim 1.

5. A metal complex as claimed in claim 2 of the formula

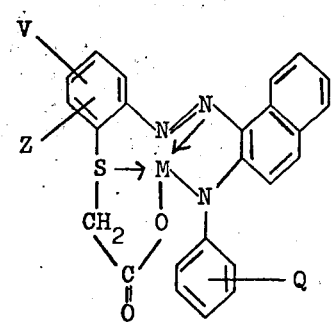

wherein M is as defined in claim 1 and V, Z and Q are as defined in claim 2.

6. A metal complex as claimed in claim 1 wherein A and/or B is a phenyl or naphthyl residue.

* * * * *

UNITED STATES PATENT AND TRADEMARK OFFICE
CERTIFICATE OF CORRECTION

PATENT NO. : 3,971,739
DATED : July 27, 1976
INVENTOR(S) : James McGeachie McCrae and Christopher Midcalf It is certified that error appears in the above-identified patent and that said Letters Patent are hereby corrected as shown below:

Column 11, between lines 45 and 50, delete "[phenyl]".

Signed and Sealed this

Sixth Day of September 1977

[SEAL]

Attest:

RUTH C. MASON
Attesting Officer

LUTRELLE F. PARKER
Acting Commissioner of Patents and Trademarks